United States Patent [19]
Ledet

[11] Patent Number: 5,195,921
[45] Date of Patent: Mar. 23, 1993

[54] APPARATUS FOR DEHEADING AND CLEANSING SHRIMP

[75] Inventor: Brent A. Ledet, Kenner, La.
[73] Assignee: The Laitram Corporation, Harahan, La.
[21] Appl. No.: 801,069
[22] Filed: Dec. 3, 1991
[51] Int. Cl.$^5$ .............................................. A22C 29/02
[52] U.S. Cl. .......................................... 452/4; 452/2
[58] Field of Search ...................................... 452/2, 4, 5

[56] References Cited

U.S. PATENT DOCUMENTS

| | | | |
|---|---|---|---|
| 3,209,393 | 10/1965 | Stephenson | 452/4 |
| 4,307,492 | 12/1981 | Braginsky et al. | 452/5 |
| 4,517,707 | 5/1985 | Braginsky et al. | 452/5 |
| 4,692,965 | 9/1987 | Stephenson | 452/4 |
| 5,112,269 | 5/1992 | Peterson, deceased et al. | 452/5 |

Primary Examiner—Willis Little
Attorney, Agent, or Firm—James T. Cronvich

[57] ABSTRACT

Apparatus for deheading and cleansing shrimp in a continuous-flow product transport system for more efficient storage or peeling. The apparatus transports food product having weakly attached appendages, such as crustaceans and especially shrimp, along conduits in a fluid medium at a flow rate as controlled by a food pump. Upstream conduit defines a flow channel having a certain cross-sectional area; downstream conduit defines a flow channel having a cross-sectional area less than that of the upstream conduit. The narrowing of the flow channel in an intermediate conduit-connecting region causes an increase in the speed of the product-laden fluid in that region. The ratio of the downstream speed to the upstream speed is inversely proportional to the ratio of the cross-sectional area of the downstream channel to the upstream channel. The abruptness of the speed increase is determined by the nature of the intermediate region. A relatively abrupt narrowing of the flow channel in the intermediate region causes an abrupt speed increase, which creates hydrodynamic forces that tend to detach, in the case of shrimp, heads from the desirable tail meat. An abrupt speed increase of about four to one is preferable. In the higher-speed downstream flow channel, further cleansing of the shrimp of sand, dirt, and visceral fluids occurs. The tails and detached heads are strained from the dirty transport fluid prior to the segregation of tails and detached heads. Detached heads are discarded, and cleansed, headless tails are made available for efficient storage or peeling.

27 Claims, 5 Drawing Sheets

APPARATUS FOR DEHEADING AND CLEANSING SHRIMP

FIELD OF THE INVENTION

This invention relates generally to seafood processing equipment, including shrimp deheading apparatus, and, more particularly, to a continuous-flow shrimp transport system capable of detaching heads from raw shrimp and cleansing the headless tail portions by means of hydrodynamic forces created by rapidly accelerating the speed of the shrimp-laden fluid in a portion of the transport system.

BACKGROUND OF THE INVENTION

It is common in shrimp-processing plants to transport raw shrimp from the loading dock to peeling machines at least part of the way by means of a transport system comprising pipes carrying a fluid conveying the shrimp. Typically the shrimp are conveyed through the pipes before finally making their way to the peelers generally intact, i.e., with heads still attached. Conventional peelers, such as those having counter-rotating rollers exemplified by the Laitram Model A Peeler manufactured by the assignee of this invention, detach the head, shell, and appendages from the shrimp meat, which is then segregated from the refuse and packed for sale. When maintained and cleaned properly, such peelers are effective at peeling shrimp. If not properly cleaned, however, eggs carried in the underbelly and visceral matter and fluids principally residing in the head cavity of the shrimp coat the roller sections of the peeler, inhibiting the positive engagement of the peeler's rollers and the grip of the peeling rollers on the shrimp thereby degrading peeling effectiveness. One way the problem has been avoided by the prior art is through the use of knurled peeling inserts and faster roller rotation to effect a more aggressive peeling action, but with a concomitant loss in the yield and quality of peeled tail meat. Another way to avoid the problem is to slow the advance of shrimp along the peeling channel, which decreases production throughput and yield. Another problem with peeling machinery is that grit and sand trapped in the head cavity, legs, and swimmerets of the shrimp abrade the surfaces of the peeling rollers, thereby decreasing their useful lifetimes. Furthermore, the spike-like thorns protruding from the shrimp heads damage the surfaces of the rollers as the shrimp are dropped into the channels for peeling.

In some peeling applications, particularly in the peeling of cold-water shrimp, the shrimp product is cooked prior to peeling. One of the difficulties encountered in precooking shrimp is achieving evenly cooked shrimp with prior art cooking methods. Because the thickest part of the tail meat is next to the body-fluid-heavy head, which acts as a thermal insulator, cooking is uneven. Furthermore, cooking energy is expended in cooking the heads, which are ultimately discarded anyway.

In many shrimp-peeling operations, especially where water usage is restricted, recirculation of the water used to urge the shrimp along the peeling and other processing machines is critical. Eggs and visceral material from the head are typically carried in the recirculated water. This waste material fosters the accumulation of bacteria and diminishes water clarity. Such dirty water is more likely to foul the water recirculation system and require more frequent maintenance.

At sea, it is not uncommon for shrimpers to cull small shrimp from a mixed catch and discard the small ones overboard, because the cost of storing them on board is greater than their market value. Furthermore, more shrimp could be stored, and with less chance of bacterial contamination, if the heads are removed prior to storage.

The removal of heads from shrimp by means of hydrodynamic forces is shown in U.S. Pat. No. 3,309,732, issued Mar. 21, 1967, and U.S. Pat. No. 3,408,686, issued Nov. 5, 1968, to Fred W. Stephenson. All of the Stephenson patents teach the deheading of shrimp by injecting the shrimp into a high-speed stream from outside the stream and using stationary structure in the vicinity of the injection point to act as a decapitating edge. Thus, the Stephenson inventions require an edge jutting into the high speed stream. Furthermore, in the Stephenson apparatus, the stream upstream of the decapitation edge does not transport shrimp. A later Stephenson patent, issued Sept. 15, 1987 as U.S. Pat. No. 4,692,965, represents an improvement on his earlier inventions that decapitates by presenting shrimp singly and oriented tail first to a high-speed stream. Besides having the same characteristics as the deheader shown in the earlier patents, the improved deheader is designed to decapitate one shrimp at a time. The improved Stephenson deheader is typically used to produce deheaded, unpeeled shrimp. As a consequence, 100% decapitation is his goal. In commercial embodiments of the improved Stephenson deheader, the goal is attained by sacrificing some meat severed from the throat portion of the shrimp. In other applications wherein peeled, rather than unpeeled, shrimp is the end product, such a sacrifice of meat is undesirable.

Consequently, some of the objects of the present invention not achieved by the prior art include: a) increasing the throughput of peeling machines without sacrificing product yield or quality; b) increasing the useful life of peeling rollers; c) improving the clarity of recirculated peeling water; d) improving storage efficiency and quality for space-limited applications; and e) enabling shrimp to be cooked prior to peeling more uniformly and energy-efficiently.

SUMMARY OF THE INVENTION

These and other objects are achieved by the present invention, which provides means for detaching weakly attached appendages from food products, such as heads from shrimp, crawfish, and similar crustaceans, in a product transport system using a fluid conveying medium A fluid laden with, for example, raw shrimp is pumped through the transport system at a preselected volumetric flow rate. Upstream and downstream conduits are put in communication by conduit connecting structure. The upstream conduit has an effective cross-sectional area greater than the downstream conduit. For a constant volumetric flow rate, the speed of the shrimp-laden fluid is correspondingly greater in the narrower downstream conduit. The increase in speed from the upstream conduit to the downstream conduit occurs in the vicinity of the connecting structure, which defines the characteristics of the acceleration. In one embodiment, connecting structure defining a small spacing between the upstream and downstream conduits causes an abrupt speed increase in its vicinity. In another embodiment, a tapered connecting structure makes for a more gradual acceleration.

Thus, the acceleration is determined by both the speed increase and the linear distance along the flow over which the speed increase occurs. The greater the speed increase and the smaller the distance over which it occurs the greater are the hydroacoustic forces effecting detachment of the weakly attached heads from the shrimp. The relative cross-sections of the upstream and downstream conduits, the volumetric flow rate, and the connecting structure are parameters that may be adjusted for the desired deheading characteristics, i.e., trading off a loss of meat for a greater percentage of decapitated shrimp. When used in conjunction with a shrimp peeling device of the counter-rotating roller type, in which incompletely detached heads are removed in the peeler anyway, loss of meat is minimized. Once the heads are removed, the shrimp bodies are thoroughly cleansed of visceral matter, as well as sand and dirt, as they are transported along the downstream conduit, thereby mitigating the prior art problems of bacterial growth and roller wear. In such a system, best results are achieved by separating detached heads from cleansed shrimp bodies prior to peeling. Commercially available separators, such as air separators, roller separators, or water flotation separators, are used for this purpose. Peeling efficiency, product throughput, product yield, product quality, and roller life are all enhanced over prior art results by the deheader of this invention, which provides a space-saving means for decapitating shrimp in bulk within a transport flow path.

BRIEF DESCRIPTION OF THE DRAWINGS

For a further understanding of the nature and objects of the present invention, reference should be made to the following detailed description, including the accompanying drawings, in which like parts are given like reference numerals and where.

DETAILED DESCRIPTION OF THE PREFERRED EMBODIMENTS

Figure 1:
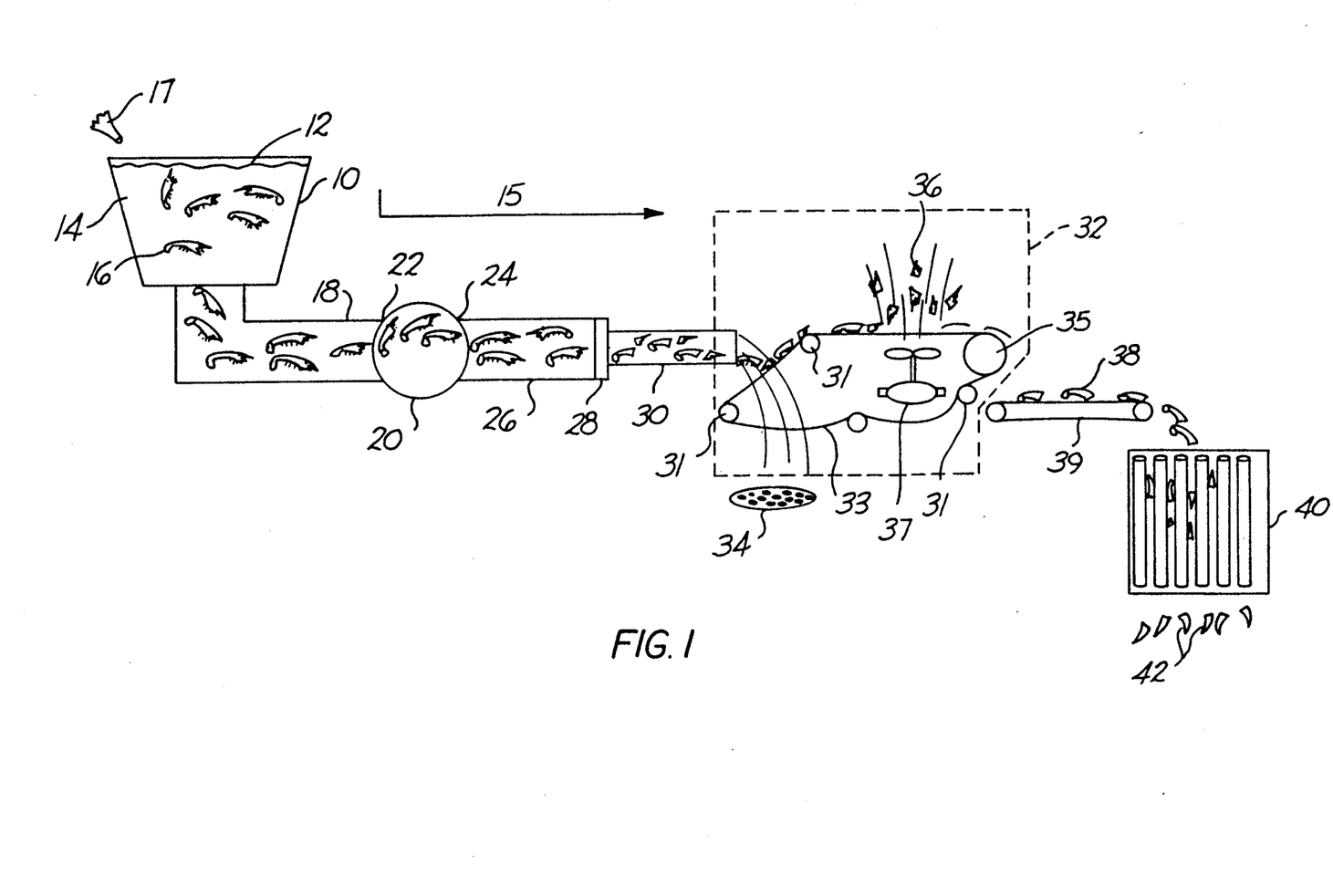
FIG. 1 is a block diagrammatic representation of a shrimp-processing system employing the apparatus of the invention.

A shrimp peeling system containing the deheading apparatus of the invention is shown in FIG. 1. Product to be processed, in this case raw shrimp 16, is held in a feed tank 10 in a reservoir of fluid 14, such as water or brine. The shrimp-laden fluid streams through transport channels formed by conduit sections 18, 26, 30 in the general direction of arrow 15 at an adjustable flow rate. The flow rate may be adjusted by means of a pump 20 connected, for example, in a flow path between a first conduit section 18 and a second conduit section 26. The pump 20 is connected at an input connection 22 to the tank 10 via conduit section 18. The output 24 of the pump 20, is connected to conduit section 26. Alternatively, the flow rate could be adjusted by appropriately adjusting the head 12, or level, of the reservoir 14 by means of a control nozzle 17. In this alternative embodiment without a pump, the conduit structure must, of course, be laid out such that the head 12, in conjunction with gravity, is sufficient to maintain flow.

Deheading of the shrimp occurs in the vicinity of conduit connecting structure 28, which puts upstream conduit 26 in fluidic communication with downstream conduit 30. The details of the deheading mechanism are described hereinafter. Shrimp exiting downstream conduit 30 are largely deheaded upon reaching a separator 32, which separates and discards heads 36 from tail sections 38. The separator includes a perforated conveyor belt 33 driven by a sprocket drive 35 around guide rollers 31. Typically, the cleansed shrimp heads and tails are strained from the fluid through the perforated belt 33 during or prior to separation, the fluid being diverted to a drain 34, for example. The shrimp heads and tails conveyed into the separator 32 are separated by means of an air separator, such as a Laitram Model AS Air Separator, or a roller separator, such as a Laitram Model S. The air separator comprises a blower motor 37 that blows the lighter detached heads 36 from the heavier tails 38. The shrimp tails are then conveyed to a peeling machine 40, such as a Laitram Model A Peeler along a conveyor path 39. The shells of the generally headless shrimp are then peeled effectively by the roller-type peeler 40 to yield quality headless shelled shrimp meat 42.

In some cases, such as where space is at a premium, the separation process could be eliminated It is also possible to eliminate the peeler in cases where the desired output product is unpeeled, headless shrimp.

Figure 2:
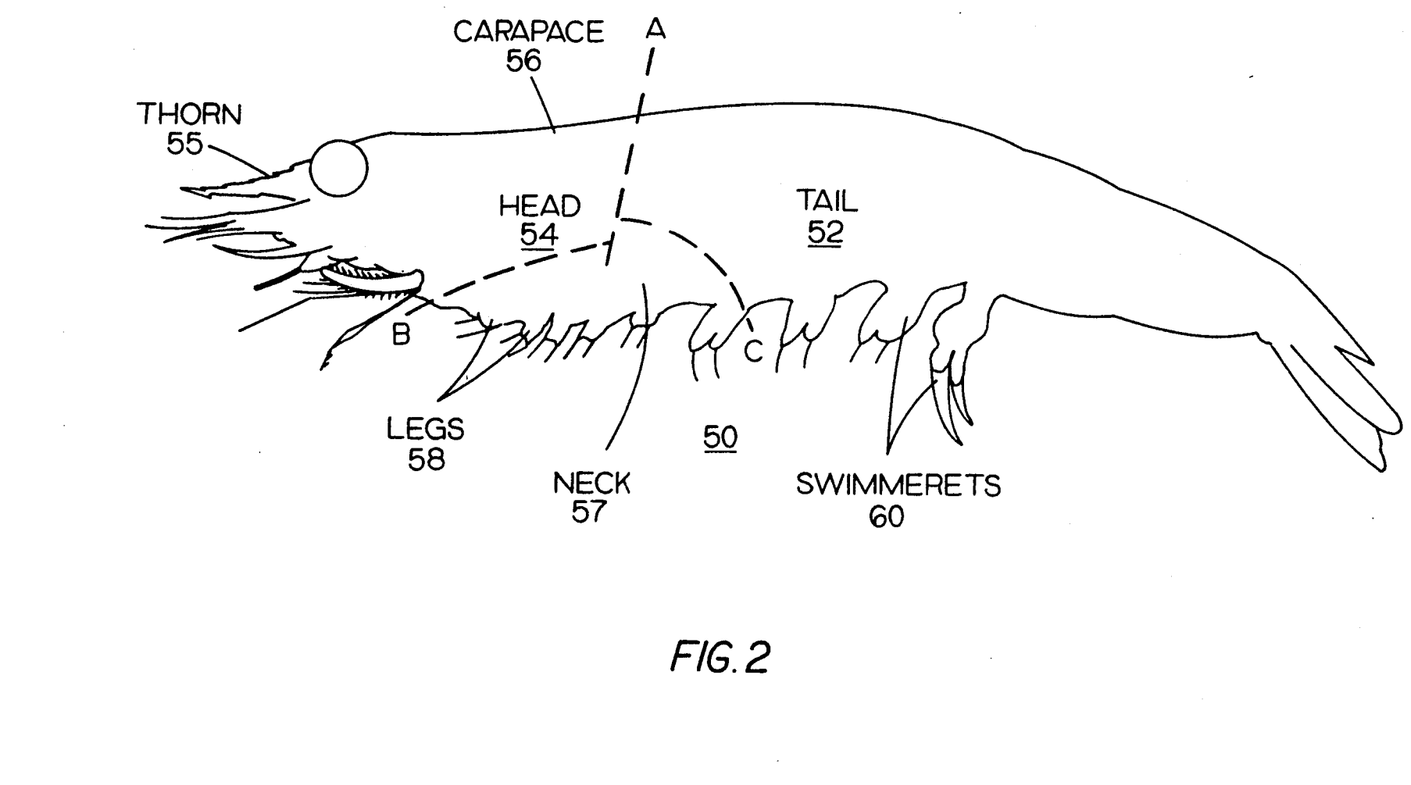
FIG. 2 is a side sectional view of the anatomy of a shrimp, clearly showing the head and tail sections.

The cutaway side view of the anatomy of a shrimp shown in FIG. 2 is helpful in explaining the advantages offered by the deheading apparatus of this invention. The shrimp 50 comprises a tail 52 and a head 54. The tail 52 includes all of the usable meat including a neck portion 57 in the lower front of the tail 52 just below the head 54. The skull, or carapace 56, which includes a spiked thorn 55, houses most of the internal organs of the shrimp. The internal organs are, of course, largely composed of fluids making the head less dense than the tail, which is mostly meat. Prior art decapitators, especially those that singulate the shrimp prior to decapitation and removal of the legs and swimmerets, tend to rip edible neck meat away from the tail during removal of the legs along the path from A to C. The thorn 55 is hard and can puncture and scar the roller surfaces as the shrimp drop into the peeling channels. The internal organs, or viscera, if not removed prior to peeling, are squeezed from the head by the peeling rollers, coating them with a slime that reduces the inter-roller friction necessary to peel shrimp effectively. The visceral matter is also fast to decay making it desirable to remove it from the shrimp as soon as practical before bacteria multiply. What's more, the visceral fluids cloud recirculated water, which requires more maintenance to keep it flowing or more frequent replacement. As can be seen, the head also represents a significant portion of the shrimp, thereby limiting the storage efficiency of head-on shrimp. Finally, the thermal insulation provided by the fluids in the head cause uneven cooking of the thick tail meat in the vicinity of the head.

Figure 3:
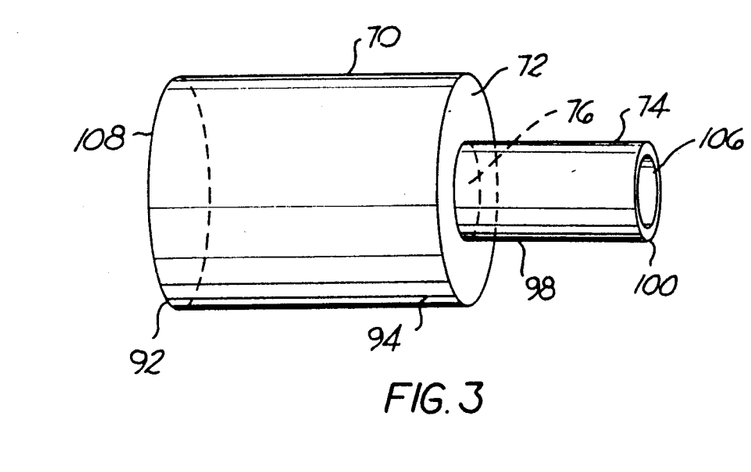
FIG. 3 is a partial perspective view of the deheading apparatus of the invention.
Figure 4:
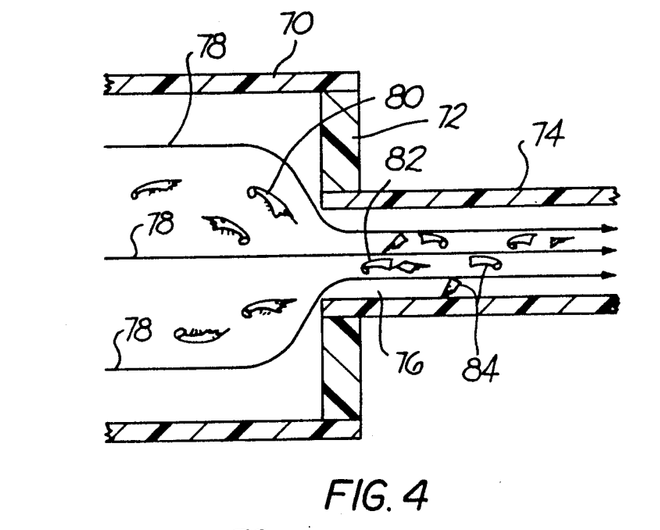
FIG. 4 is a partial side sectional view of the deheading apparatus of the invention, pictorially illustrating the deheading o shrimp.

Deheading of shrimp according to the invention is illustrated in FIGS. 3 and 4. Whole shrimp 80 are conveyed in a fluid along conduits in the direction indicated by streamlines 78. An upstream conduit 70, having an upstream end 92 and a downstream end 94, is connected to an upstream end 98 of narrower downstream conduit 74 by conduit connecting structure 72 having an aperture 76. For any given volumetric flow rate in the conduit system, the speed of the shrimp-laden fluid in the channel formed by the upstream conduit 70 is equal to the ratio of the volumetric flow rate to the minimum cross-sectional area 108 of the upstream channel. Likewise, the speed in the downstream channel is the ratio of the volumetric flow rate to the minimum cross-sectional area 106 of the downstream channel. Thus, the speed in the narrower downstream conduit is greater than in the upstream conduit. In fact, for a given volumetric flow rate, the speed at any section along the channel varies inversely with the cross-sectional area of that section of the channel. This speed increase, or acceleration, is depicted by the streamlines 78. The farther apart they are, the slower is the speed. Where they are shown parallel, the speed is constant. Shrimp 80 in the upstream conduit 70 are carried along at first speed until they reach the vicinity of the connecting structure 72, at which point they are accelerated as they enter the narrower downstream conduit 74. The acceleration creates hydrodynamic forces that pull the weakly attached heads away from the tail 82 until they are detached into head and tail portions 84, regardless of the orientation of the shrimp with respect to the conduit structure. Detachment occurs generally along the path from A to B shown in FIG. 2. As the tails and detached heads continue down the downstream conduit 74 toward an exit end 100, visceral fluids and dirt are washed from the heads, legs, and swimmerets. Because the deheading process is integrated into the transport system, it takes virtually no additional space beyond that required by the transport system anyway.

The harshness of the deheading process is determined by the linear distance over which the acceleration occurs and by the magnitude of the acceleration, which is, in turn, a function of the volumetric flow rate and the relative cross-sectional areas of the upstream and downstream channels. If the dimension of the connecting structure along the flow path is small, the acceleration is abrupt and effective at removing heads. Tests of the apparatus of the invention lead to the conclusion that upstream-to-downstream cross-sectional area ratios and, hence, downstream-to-upstream speed ratios of between about two and sixteen effectively dehead shrimp, but that ratios of about four produce the best results. Tests have also shown that, for a cylindrical upstream conduit with an inside diameter of 4 in (10.16 cm), or a cross-sectional area of 81 cm$^2$, a volumetric flow rate of between about 250 gal/min and 300 gal/min is desirable. For a 6 in (15.24 cm) diameter upstream conduit, or a cross-sectional area of 182.4 cm$^2$, a volumetric flow rate of more than 300 gal/min is preferable. Of course, conduits having cross-sections other than circular are within the scope of the invention.

Figure 5:
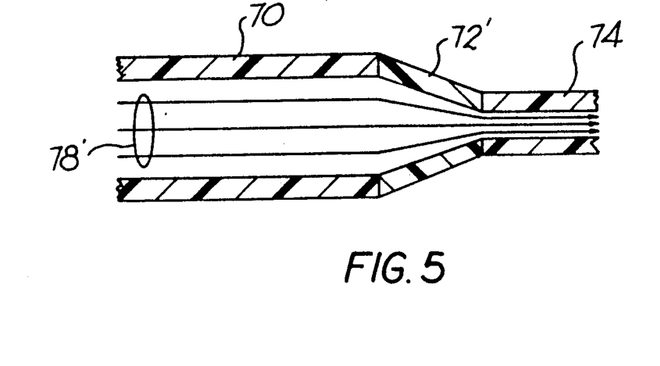
FIG. 5 is a partial side sectional view of another embodiment of the deheading apparatus of the invention for a more gradual speed increase.

Another embodiment, in which the acceleration is more gradual, is demonstrated in FIG. 5, in which the conduit connecting structure 72' is tapered from the upstream conduit to the narrower downstream conduit. Thus, the speed increase occurs over a longer linear distance as indicated by the conveying streamlines 78' in the vicinity of the connecting structure.

Figure 6:
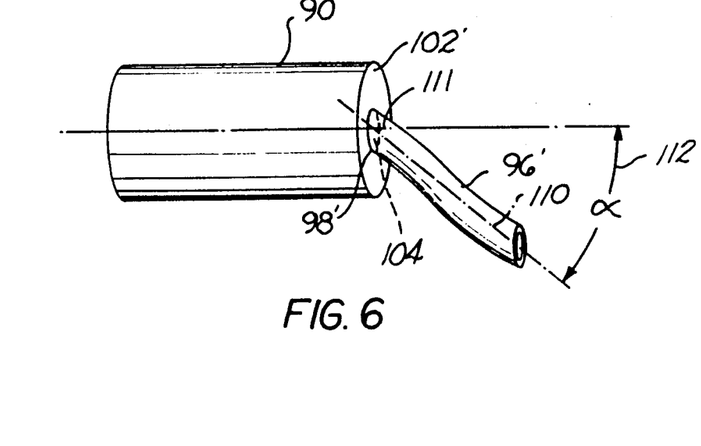
FIG. 6 is a partial perspective view of another embodiment of the deheading apparatus of the invention wherein the downstream conduit is not coaxial with the upstream conduit

Although the embodiment of FIGS. 3 and 4 is the simplest, other embodiments are clearly within the scope of the invention. In FIG. 6, upstream conduit having a longitudinal axis 111 is connected by connecting structure 102' to downstream conduit 96' having a different longitudinal axis 110. In this case the mouth of the entrance end 98' of the downstream conduit forms a plane angled with respect to the plane of the cross-sectional area. The angle between the planes is equivalent to an angle 112, designated by α, between the axes 110, 111 of the downstream and upstream conduits 90, 96'.

Figure 7:
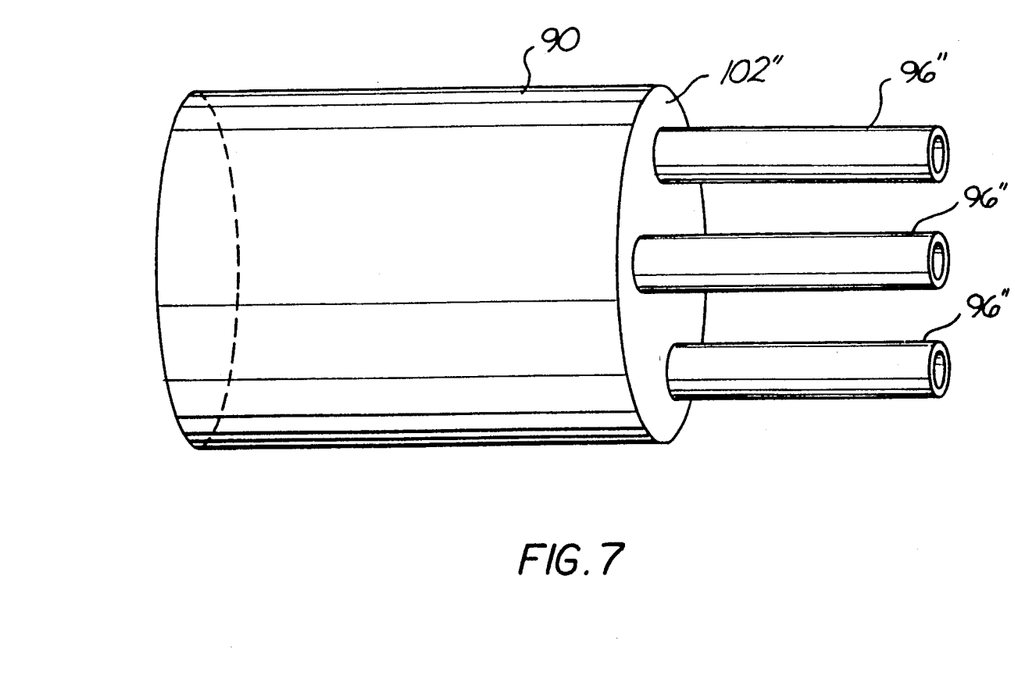
FIG. 7 is a partial perspective view of another embodiment of the deheading apparatus of the invention wherein a plurality of downstream conduits are coupled to an input conduit.

Yet another embodiment, shown in FIG. 7, comprises a single upstream conduit 90 connected into a plurality (in this case three) of downstream conduits 96''. Connecting structure 102'' correspondingly has three apertures for the downstream conduits. This embodiment is useful in situations wherein one product feed tank and a single pump are used to supply a number of different processing stations. As long as the net cross-sectional area of output conduit channels is less than that of input conduit, the detachment of heads through hydrodynamic forces is effectively achieved.

Figure 8:
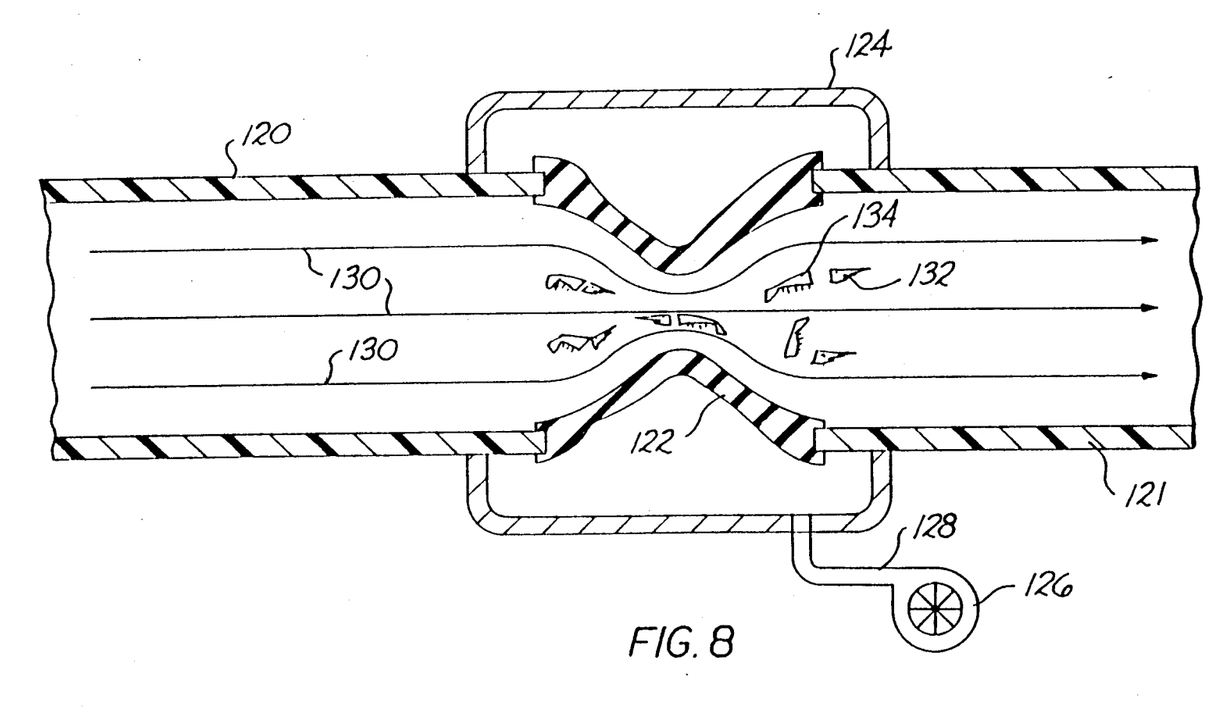
FIG. 8 is a partial side sectional view of another embodiment of the deheading apparatus of the invention wherein flow acceleration is achieved by an adjustable channel restriction.

Another embodiment, in which the acceleration is controllable by means of an adjustable restriction in the flow path, is shown in FIG. 8. Conduit sections 120 and 121 are joined by a section 122 having an adjustable restriction, in this case, a flexible, rubber section. A chamber 124, surrounding the flexible section 122, can be pressurized with air from a pump 126 through an air tube 128. The greater the pressure, the narrower is the restriction, which forces the streamlines 130 to converge at the restriction, thereby indicating acceleration. The acceleration causes heads 132 to separate from shrimp tails 134. Of course, other types of valves could also be used to restrict the flow channel to create the step in acceleration necessary to dehead shrimp.

One skilled in the art can appreciate that, although the invention was described in the context of shrimp transport and processing machinery, it is also applicable to transporting and processing in a continuous-flow fluid stream other products having weakly connected undesirable appendages. Thus, the invention provides a novel, simple, space-saving means for transporting, cleansing, and detaching weakly attached appendages from products prior to further processing. Accordingly, those novel features defining the spirit and nature of the invention are set forth with particularity in the following claims.

What is claimed is:

1. Apparatus for detaching heads from shrimp conveyed in a fluid stream through conduits, comprising:
   upstream conduit enclosing a first channel with a first cross-sectional area, said upstream conduit having a first end and a second end downstream of the first end;

downstream conduit enclosing a second channel with a second cross-sectional area less than said first cross-sectional area, said downstream conduit having an entrance end and an exit end;

conduit connecting structure having a transition region of sharply decreasing channel cross-sectional area for putting the second end of said upstream conduit into exclusive communication with the entrance end of said downstream conduit such that the fluid stream entering the entrance end of said downstream conduit is limited to the fluid stream exiting the second end of said upstream conduit, the sharply decreasing channel cross-sectional area of said transition region causing a significant change in fluid speed through a turbulent flow path; and flow control means for inducing a flow rate of shrimp-laden fluid through said upstream and downstream conduits producing a change in the speed of the fluid in said transition region sufficient to detach heads from the shrimp by restriction of the turbulence of the fluid.

2. The apparatus of claim 1, wherein said flow control means comprises a pump connected to said upstream conduit so as to force shrimp-laden fluid through said upstream conduit.

3. The apparatus of claim 1, wherein said upstream and downstream conduits are formed to encompass said respective first and second channels having cross-sectional channel areas that are substantially circularly shaped.

4. The apparatus of claim 1, wherein said upstream and downstream conduits are coaxially aligned on opposing sides of said conduit connecting structure.

5. The apparatus of claim 1, wherein said conduit connecting structure comprises a plate attached to and covering the second end of said upstream conduit, said plate having a pair of opposing flat sides and circumscribing an aperture therethrough, one of said flat sides positioned adjacent the second end of said upstream conduit, the other one of said flat sides positioned adjacent the entrance end of said downstream conduit, said upstream conduit communicating with said downstream conduit through said aperture.

6. The apparatus of claim 5, wherein said plate circumscribes an aperture having a shape substantially the same as the second cross-sectional channel area of said downstream conduit.

7. The apparatus of claim 1, wherein said conduit connecting structure comprises a tapered hollow tube having a wider base end and a narrower exit end, the base end attached to the second end of said upstream conduit and the exit end attached to the entrance end of said downstream conduit.

8. The apparatus of claim 1, wherein said upstream and downstream conduits are dimensioned such that said first cross-sectional channel area is between about two and sixteen times said second cross-sectional channel area.

9. The apparatus of claim 8, wherein said upstream and downstream conduits are dimensioned such that said first cross-sectional channel area is about four times said second cross-sectional channel area.

10. The apparatus of claim 8, wherein said first cross-sectional channel area is about 81 cm$^2$ and the flow rate is between about 250 gal/min and 300 gal/min.

11. The apparatus of claim 8, wherein said first cross-sectional channel area is about 182 cm$^2$ and the flow rate is greater than 300 gal/min.

12. The apparatus of claim 1, wherein said upstream and downstream conduits are dimensioned such that said second cross-sectional channel area is smaller than said first cross-sectional channel area by an amount sufficient to ensure that the increase in the speed of the fluid is between about two times and sixteen times.

13. The apparatus of claim 12, wherein said upstream and downstream conduits are dimensioned such that the increase in the speed of the fluid is about four times.

14. The apparatus of claim 1, wherein the entrance end of said downstream conduit comprises a substantially planar mouth lying in a plane parallel to a plane containing said second cross-sectional channel area near the entrance end.

15. The apparatus of claim wherein said upstream conduit confines a single fluid stream and said downstream conduit confines a single fluid stream.

16. The apparatus of claim 1, wherein the length of said downstream conduit is of sufficient length to provide a cleansing region in which dirt and visceral fluids are thoroughly cleansed from the tail portions of the shrimp.

17. Apparatus for detaching heads from shrimp, comprising:

conduit enclosing a fluid flow path and including an upstream region, a downstream region, and an intermediate region between the upstream and downstream regions;

said intermediate region having a sharply decreasing flow area causing a significant change in fluid speed through a turbulent flow path;

means for introducing shrimp into said flow path; and flow control means for inducing a flow rate through said intermediate region producing a change in fluid speed sufficient to detach shrimp heads from tail portions in said intermediate region by constriction of the turbulence of the fluid.

18. The apparatus of claim 17, wherein said conduit is formed with the downstream region having a flow cross-section less than the flow cross-section of the upstream region causing an increased fluid speed in the downstream region relative to the fluid speed in the upstream region.

19. The apparatus of claim 18, wherein the downstream region extends from the intermediate region for a distance sufficient to sustain the increased fluid speed for a distance sufficient to cleanse dirt and visceral fluids from shrimp tail portions.

20. Apparatus for detaching weakly attached appendages from product in a continuous-flow, product transport system using a fluid stream as the transport medium, comprising:

upstream conduit forming a first product-laden fluid transport channel;

downstream conduit forming a second product-laden fluid transport channel;

conduit interface means for putting said downstream conduit in communication with said upstream conduit such that product-laden fluid flows from said upstream conduit to said downstream conduit through said interface means;

means for adjusting the volumetric flow rate through the product transport system;

said upstream conduit being dimensioned such that said first transport channel has a first effective cross-sectional area such that product-laden fluid in said first transport channel flows at a first speed equal to the ratio of the volumetric flow rate to the first effective cross-sectional area, said downstream conduit being dimensioned such that said second transport channel has a second effective cross-sectional area such that product-laden fluid in said second transport channel flows at a second speed equal to the ratio of the volumetric flow rate to the second effective cross-sectional area, the first effective cross-sectional area being greater than the second effective cross-sectional area, whereby product-laden fluid traveling at the first speed in said upstream conduit accelerates to the greater second speed in said downstream conduit in the vicinity of the interface means and creates hydrodynamic forces effective to detach weakly attached appendages from product.

21. The apparatus of claim 20, wherein said conduit interface means comprises an annular plate having opposing flat sides and circumscribing an aperture therethrough, said annular plate having an outer perimeter corresponding to the shape of said upstream conduit and having an inner perimeter of the aperture corresponding to the shape of said downstream conduit, said upstream conduit being sealably attached to one of said opposing flat sides at said outer perimeter, and said downstream conduit being sealably attached to the other of said opposing flat sides at said inner perimeter, such that said upstream conduit and said downstream conduit communicate through said aperture.

22. The apparatus of claim 20, wherein said conduit interface means comprises structure for spacing the first transport channel of said upstream conduit from the second transport channel of said downstream conduit by a distance small relative to the inside cross-sectional dimensions of said upstream conduit, whereby the transition of the product-laden fluid from said first speed to said greater second speed is abrupt.

23. The apparatus of claim 20, wherein said means for adjusting the volumetric flow rate comprises a food pump.

24. In a system for peeling the shells from shrimp using a fluidstream product transport system to transport unpeeled shrimp at least part of the way to a shrimp-peeling apparatus of the counter-rotating roller type, the improved system capable of separating heads from shrimp prior to peeling, comprising:

upstream conduit with a first cross-sectional channel area and having a first end and a second end downstream of the first end;

downstream conduit with a second cross-sectional channel area and having an entrance end and an exit end;

conduit connecting structure putting the second end of said upstream conduit into communication with the entrance end of said downstream conduit;

means for moving shrimp-laden fluid through said upstream and downstream conduits at a preselected volumetric flow rate, and said second cross-sectional channel area being less than said first cross-sectional channel area such that the shrimp-laden fluid travels at a first speed in said upstream conduit and a greater second speed in said downstream conduit, the speed increase producing hydrodynamic forces for detaching heads from and cleansing the shrimp bodies at and downstream of the entrance end of said downstream conduit; and means for separating the lighter detached heads from cleansed shrimp bodies, said means for separating receiving the heads and shrimp bodies exiting the exit end of said downstream conduit, headless cleansed shrimp bodies being conveyable from said means for separating to shrimp-peeling apparatus for removal of shell and other appendages.

25. The improved system of claim 24, wherein said means for moving comprises a food pump connected to the first end of said upstream conduit.

26. The method of deheading shrimp, comprising the steps of:

creating a fluid flow path through a closed pipe having a region of sharply decreasing cross-sectional area causing a significant change in fluid speed through a turbulent flow path;

introducing shrimp in said fluid flow path; and inducing a flow volume through said region producing a change in fluid speed sufficient to detach shrimp heads from tail portions in said region by restriction of the turbulence of the fluid.

27. Apparatus for detaching heads from shrimp conveyed in a fluid stream through conduits, comprising:

upstream conduit enclosing a first channel with a first cross-sectional area, said upstream conduit having a first end and a second end downstream of the first end;

downstream conduit enclosing a second channel with a second cross-sectional area less than said first cross-sectional area, said downstream conduit having an entrance end and an exit end;

conduit connecting structure having a transition region of sharply decreasing channel cross-sectional area for putting the second end of said upstream conduit into communication with the entrance end of said downstream conduit and causing a significant change in fluid speed through a turbulent flow path;

flow control means for inducing a flow rate of shrimp-laden fluid through said upstream and downstream conduits producing a change in the speed of the fluid in said transition region sufficient to detach heads from the shrimp by restriction of the turbulence of the fluid; and wherein said upstream and downstream conduits are coaxially aligned on opposing sides of said conduit connecting structure.

* * * * *